United States Patent [19]
Faris et al.

[11] Patent Number: 6,072,549
[45] Date of Patent: *Jun. 6, 2000

[54] "INTELLIGENT" GLAZING STRUCTURES WITH ADDITIONAL CONTROL LAYERS

[75] Inventors: Sadeg Faris, Pleasantville; Le Li, Yorktown Heights, both of N.Y.

[73] Assignee: Reveo Inc, Hawthorne, N.Y.

[ * ] Notice: This patent is subject to a terminal disclaimer.

[21] Appl. No.: 09/039,297

[22] Filed: Mar. 14, 1998

Related U.S. Application Data

[63] Continuation-in-part of application No. 08/805,603, Feb. 26, 1997, which is a continuation-in-part of application No. 08/739,467, Oct. 29, 1996, which is a continuation-in-part of application No. 08/550,022, Oct. 30, 1995, Pat. No. 5,691,789, and application No. 08/787,282, Jan. 24, 1997, which is a continuation of application No. 08/265,949, Jun. 2, 1994, which is a division of application No. 07/798,881, Nov. 27, 1991, Pat. No. 5,364,557, application No. 08/715,314, Sep. 16, 1996, and application No. 08/743,293, Nov. 4, 1996.

[51] Int. Cl.⁷ .............. G02F 1/1335; G02F 1/1333; C09K 19/02
[52] U.S. Cl. .............. 349/16; 349/86; 349/115; 349/113; 349/175
[58] Field of Search .................. 349/16, 86, 96, 349/115, 176, 112, 113, 59

[56] References Cited

U.S. PATENT DOCUMENTS

| | | | |
|---|---|---|---|
| 3,711,181 | 1/1973 | Adams, Jr. et al. | 349/176 |
| 4,475,031 | 10/1984 | Mockovciak, Jr. | 349/16 |
| 5,193,015 | 3/1993 | Shanks | 349/115 |
| 5,686,979 | 11/1997 | Weber et al. | 349/96 |

*Primary Examiner*—William L. Sikes
*Assistant Examiner*—Dung Nguyen
*Attorney, Agent, or Firm*—Rodney T. Hodgson

[57] ABSTRACT

An "intelligent" window combined with an additional structure for further controlling light incident on the "intelligent" window is disclosed.

36 Claims, 4 Drawing Sheets

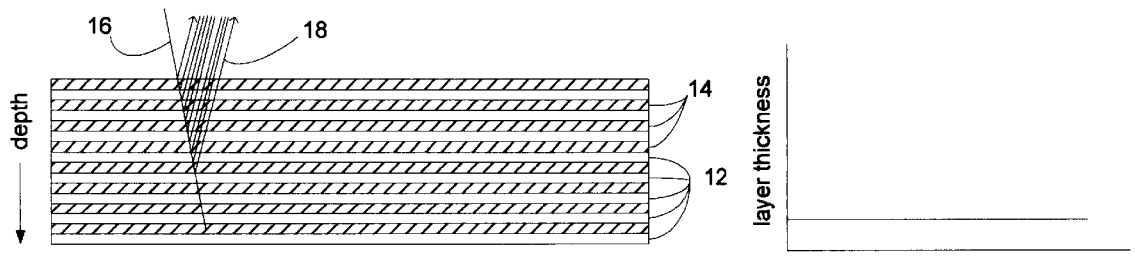
Fig. 1a Prior Art
Fig. 1b Prior Art
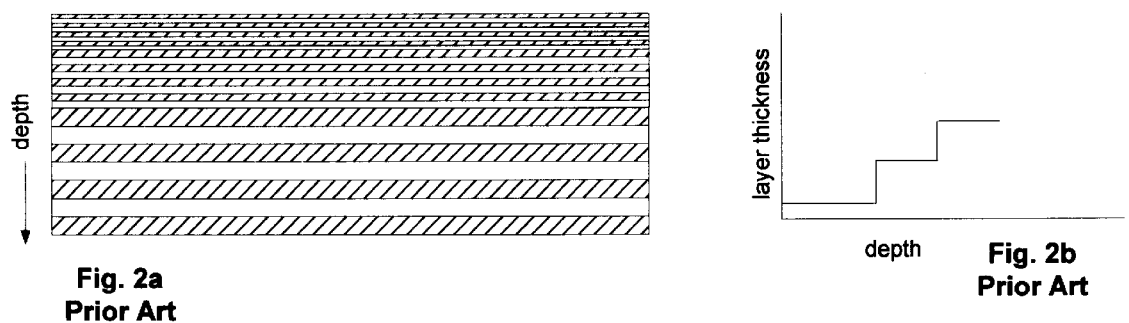
Fig. 2a Prior Art
Fig. 2b Prior Art
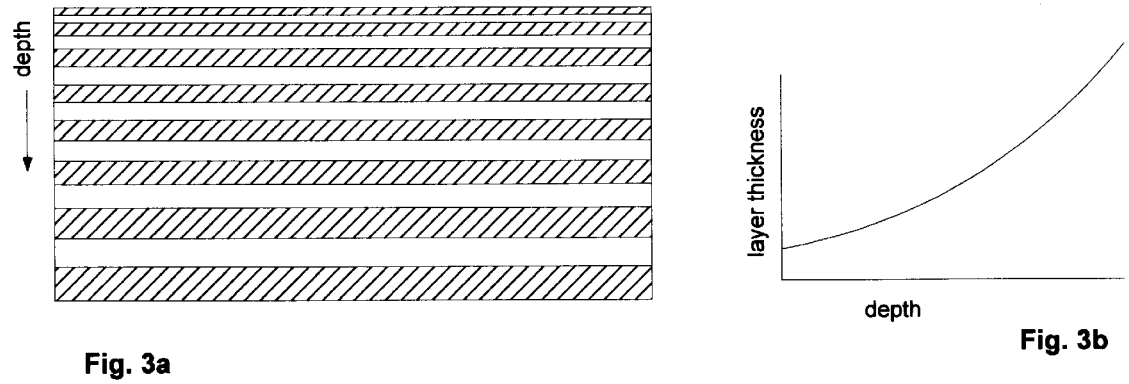
Fig. 3a
Fig. 3b

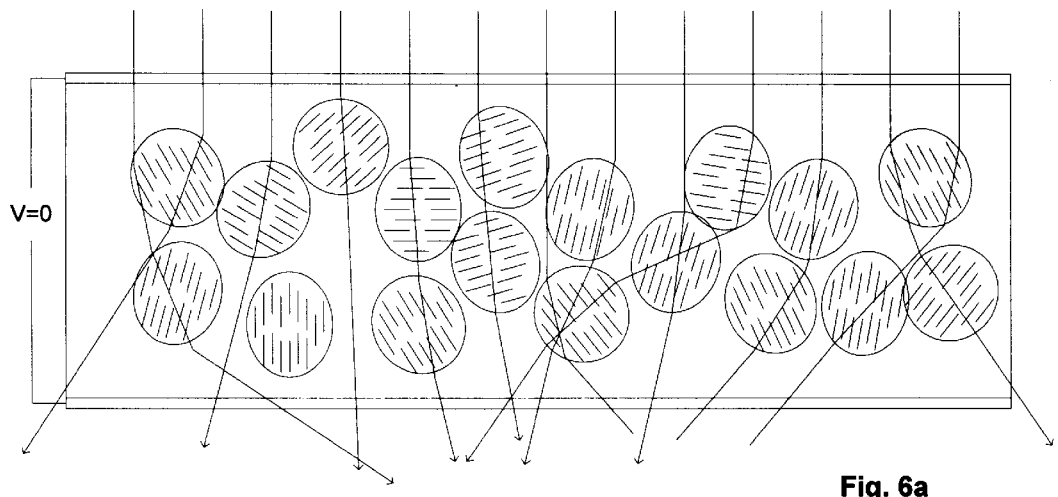
PLDC  Fig. 6a
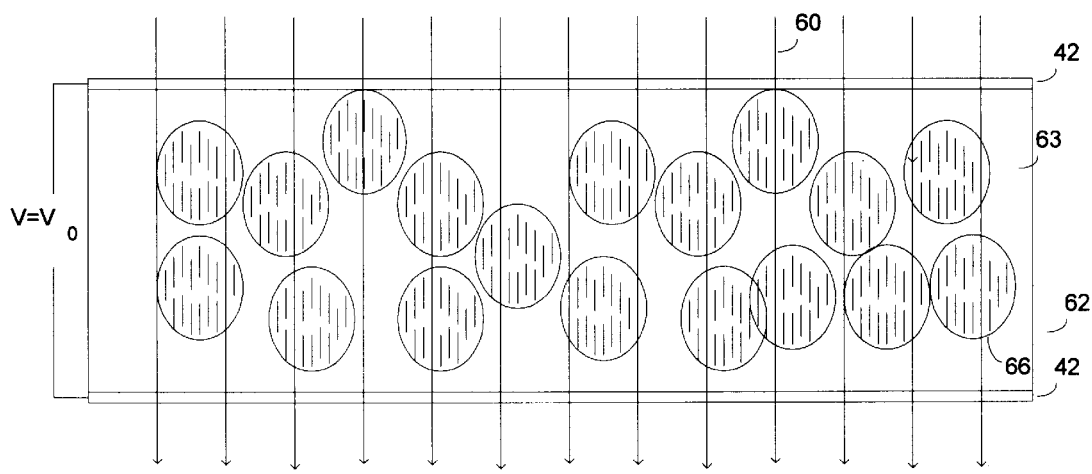
PLDC  Fig. 6b

"INTELLIGENT" GLAZING STRUCTURES WITH ADDITIONAL CONTROL LAYERS

RELATED CASES

This is a Continuation-in-part of copending application Ser. No. 08/805,603 entitled "Electro-optical glazing structures having total-reflection and transparent modes of operation for use in dynamical control of electromagnetic radiation" by Sadeg M. Faris and Le Li, filed Feb. 26, 1997, which is a continuation-in-part of: copending application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996, which is a Continuation-in-Part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995; copending application Ser. No. 08/787,282 entitled "Cholesteric Liquid Crystal Inks" by Sadeg M. Faris filed Jan. 24, 1997, which is a Continuation of application Ser. No. 08/265,949 filed Jun. 2, 1994, which is a Divisional of application Ser. No. 07/798,881 entitled "Cholesteric Liquid Crystal Inks" by Sadeg M. Faris filed Nov. 27, 1991, now U.S. Pat. No. 5,364,557; copending application Ser. No. 08/715,314 entitled "High-Brightness Color Liquid Crystal Display Panel Employing Systemic Light Recycling and Methods And Apparatus For Manufacturing The Same" by Sadeg Faris filed Sep. 16, 1996; copending application Ser. No. 08/743,293 entitled "Liquid Crystal Film Structures With Phase-Retardation Surface Regions Formed Therein And Methods Of Fabricating The Same" by Sadeg Faris filed Nov. 4, 1996; each said application being commonly owned by Reveo, Inc., and incorporated herein by reference in its entirety.

BACKGROUND OF THE INVENTION

1. Field of Invention

The present invention relates generally to an electro-optical glazing structures ("smart windows") having reflection, semi-transparent, and transparent modes of operation which are electrically-switchable for use in dynamically controlling electromagnetic radiation flow in diverse applications and which have an additional layer to control incident light.

2. Brief Description of the Prior Art

The use of multilayer polymer films for controlling reflectivity has been known for many years. Such films comprise many layers, generally alternating between two types of transparent polymer, each having different refractive indices and an appropriate thickness related to the wavelength of the light to be controlled. U.S. Pat. No. 3,711,176, by Alfrey, Jr. et al. detailed theoretical details of such a film. U.S. Pat. No. 3,610,729, by Howard Rogers introduces a multilayer polarizer, where each alternate layer is birefringent, where the index of refraction for light of a first linear polarization differs from layer to layer and that linear polarization is reflected, and the index of refraction for light of the second linear polarization is the same from layer to layer and the second linear polarization light is transmitted. The bandwidth of the light reflected from such multilayer films is generally limited to a small portion of the bandwidth of visible light (20 nanometers in the case of the Alfey patent. Also, if an infra red reflecting film is required which is transparent in the visible region, higher order effects occur to produce unwanted reflected colors from the film. U.S. Pat. No. 5,103,337, by Schrenk et al. proposes using more than two different materials to control unwanted higher order effects. U.S. Pat. No. 5,686,979, by Weber et al., proposes to use multilayer reflecting polarizing film as a "smart window" for the control of light by reflecting the light. The reflectivity, however, is generally limited to a narrow bandwidth and such films are not equally transparent outside of the reflective bandwidth of the films. General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992). Smart Window Design is treated in "Electrochromism and smart window design", by C. Granqvist, Solid State Ionics 53–56 (1992) and "large scale electochromic devices for smart windows and absorbers", by T. Meisel and R. Baraun, SPIE, 1728, 200 (1992). The above identified U.S. patents and references are hereby incorporated by reference.

Objects of the Present Invention

It is an object of the invention to provide a "smart window" having an additional layer to control light incident upon the window which is not generally controlled by the smart window.

It is an object of the invention to provide a "smart window" combined with a light scattering layer for further control of transmitted light.

SUMMARY OF THE PRESENT INVENTION

The present invention provides an additional means of controlling light incident on a smart window, whereby light outside the bandwidth normally controlled by the smart window may be controlled, and whereby light inside the bandwidth normally controlled by the smart window which leaks through the window may be controlled.

BRIEF DESCRIPTION OF THE DRAWINGS

FIG. 1a shows a sketch of a prior art multilayer polymer reflector.

FIG. 1b shows the distribution of thickness of layers of prior art multilayered polymer reflectors as a function of depth into the multilayer film of FIG. 1a.

FIG. 2a shows a sketch of a prior art multilayer polymer reflector.

FIG. 2b shows the distribution of thickness of layers of prior art multilayered polymer reflectors as a function of depth into the multilayer film of FIG. 2a.

FIG. 3a shows a sketch of a multilayer polymer reflector film having a non linear distribution of thickness of the layers.

FIG. 3b shows a graph of the distribution of thickness of layers of a multilayered polymer reflector as a function of depth into the multilayer film of FIG. 3a.

FIG. 6a–b shows an additional scattering panel of the invention for further controlling light transmitted through the "smart window".

DETAILED DESCRIPTION OF THE PRESENT INVENTION

Figure 4A:
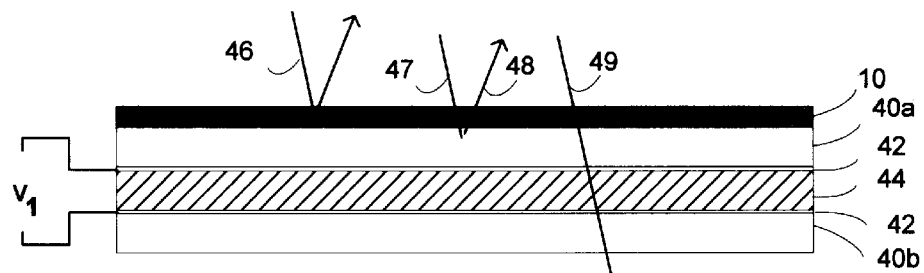
FIG. 4a shows a glazing panel for a "smart window" in transmission mode, using an additional control layer to control light incident on the window that is outside of the bandwidth of the light controlled by the "smart window" combination.

FIG. 1a shows a sketch of a prior art multilayer reflector film 10. Pairs of layers of two different transparent polymer materials 12 and 14 are arranged with each layer adjacent the next layer. Such films are generally co-extruded and pulled so that the thickness of the layers is in the submicrometer range. For a reflector, the layers shown in FIG. 1a are equal to one quarter of an optical wavelength (the wavelength of the light to be reflected divided by the index of refraction of the material for light of that wavelength). An incident light ray 16 is shown impinging on the film 10, and many reflections 18 are shown reflecting from the interface of the two transparent polymer materials 12 and 14. If the wavelength of the incident light 16 is correct, the reflections from the material interfaces add coherently to give high reflection. The "wavelength" of designed reflectivity is usually designed for light incident normally on to the film 10. FIG. 1a shows the light slightly off normal incidence, and for large angles of incidence the wavelength of maximum reflectivity shifts to longer wavelengths because of the longer path length of the light in the materials 12 and 14. The light rays 16 and 18 are shown unrefracted at the material interfaces for clarity of presentation.

FIG. 1b shows a sketch of the thickness of the material layers as a function of depth into the film for the stack shown in FIG. 1a.

FIG. 2a is a sketch of a prior art multilayer reflector which attempts to make the reflector broad band. The prior art literature proposes a monotonic or stepwise increase in the thickness of the layers. The layer thickness increases by step function in FIG. 2a. Each stack of different thicknesses reflects a different narrow band of light. The reflection coefficient is not constant over the reflective bandwidth of the film. A problem arises when the stack shown in FIG. 2a is used for an infrared reflecting film to cover a window. Second order effects produce a visible color in the film. This problem is addressed in the cited U.S. Pat. No. 5,103,337, by Schrenk et al., who proposed films having three different materials to do away with second order reflection effects. FIG. 2b shows a sketch of the layer thickness as a function of depth into the film.

An apparatus for overcoming the objections to the prior art multilayer films is shown in FIG. 3a. The transparent polymer material layers have thicknesses which increase into the depth of the film in a non-linear way. It is shown in great detail in copending application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996, which is a Continuation-in-Part of copending application Ser. No. 08/550,022 (Now U.S. Pat. No. 5,691, 789) entitled "Single Layer Reflective Super Broadband Circular Polarizer and Method of Fabrication Therefor" by Sadeg M. Faris and Le Li filed Oct. 30, 1995, that a non linear distribution of the twist of a cholesteric liquid crystal (CLC) polarizer is vital to producing a broad band reflector having a reflectivity which varies little over the reflection band. Such CLC reflectors also have smooth reflectivity profiles in the second order if the CLC material is used to reflect infrared light.

To use the CLC broadband reflectors of the prior applications to reflect all the incident light in a particular bandwidth, of two types of CLC must be used. One type reflects right hand circularly polarized (RHCP) light. The other reflects left hand circularly polarized (LHCP) light.

To reflectivity at the interfaces of the two types of materials in FIG. 3a is not necessarily dependent on the polarization of the incident light. However, the two types of material shown in FIG. 3a may include birefringent materials as detailed in U.S. Pat. No. 3,610,729, by Howard Rogers. In this case, the multilayer polarizer resulting with a non-linear thickness variation would be very broad band. Such polarizers could be used to great effect in the "smart window" applications of copending application Ser. No. 08/805,603 entitled "Electro-optical glazing structures having total-reflection and transparent modes of operation for use in dynamical control of electromagnetic radiation" by Sadeg M. Faris and Le Li, and U.S. Pat. No. 5,686,979, by Weber et al.

Figure 4B:
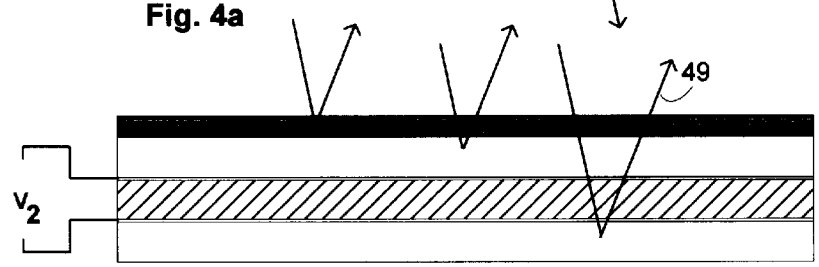
FIG. 4b shows the glazing panel of FIG. 4a in reflection mode.

FIG. 4a shows the film 10 used to controllably reflect a first bandwidth of light, for example the infrared bandwidth, while the "smart window" of the above identified references is used to control the transmission and reflection of a second bandwidth of light (for example the visible portion). Smart windows are typically a glazing structure comprising two polarization dependent transparent sheets 40a and 40b sandwiching a transparent conduction material 42 such as indium tin oxide (ITO) and a polarization control material 44 which changes state under an electric field. The polarization control material generally rotates the plane of polarization of linearly polarized incident light by 90 degrees, or changes RHCP to LHCP light, and vice versa. Support materials such as glass panes are not shown for clarity. Light of the first bandwidth 46 is reflected at the film 10, while light in the second bandwidth 47 passes film 10. In one embodiment of the smart window using multilayer polarizers to reflect light, light of a first linear polarization is reflected from layer 40a, while light of the second polarization is transmitted through the polarization control material 44. Depending on the voltage imposed across the polarization control material, the polarization state of the light transmitted is controlled so that the light is reflected (FIG. 4b) or the light is transmitted (FIG. 4a) by polarization dependent layer 40b. Other embodiments of smart windows shown in detail in copending applications may controllably transmit or reflect all of the incident light in a broad bandwidth. The layer 10 may be a multilayer broadband reflector, or it may be a broad band reflecting CLC layers.

Figure 4C:
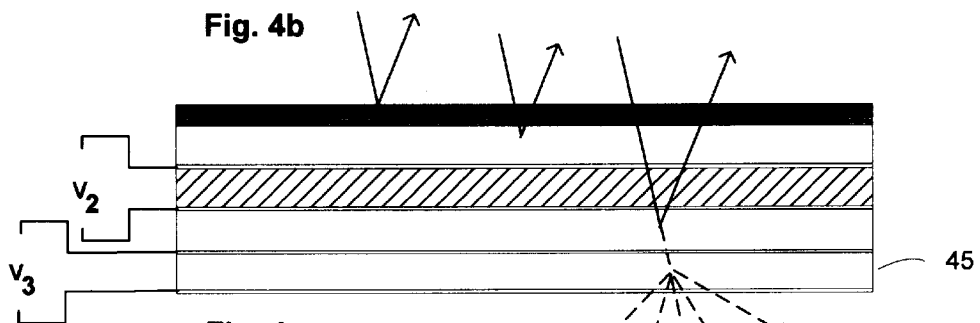
FIG. 4c shows the glazing panel of FIG. 4a with an additional panel for further controlling light transmitted through the "smart window".

FIG. 4c shows a sketch of the invention, whereby an additional controllable layer is added to the smart window structure of FIG. 4a. It is very difficult to ensure that 100% of the light across the entire visible wavelength is reflected, and the privacy of occupants of a room with such a smart window may be compromised. An additional layer 45 is used to control the light which is transmitted through the smart window. The embodiment shown in FIG. 4c uses a scattering layer as layer 45. Layer 45 may also be an absorptive layer, for example and electrochromic panel or absorptive polarizers. Electrochromism is defined as a reversible optical absorption change induce in a material by an electrochemical redox process. The electrochromic device employs two electrochromic materials (ECM) with "complimentary" properties. The first electrochromic material is normally reduced and undergoes a colorless-to-colored transition upon reduction. The second electrochromic material is oxidized and undergoes a similar color transition upon gain of electrons. Most electrochromic smart windows adopt a thin film configuration. The two complementary electrochromic materials are coated on two opposite electrodes and remain there during the redox coloration process. The embodiment of the invention shown in FIG. 4c may be used either with or without the layer 10 used to reflect the infrared light.

A multilayer transparent polymer film may be used as a polarization reflector 40a and 40b in a smart window using linear polarizationl. An additional embodiment consists of a passive infrared reflecting film comprising two CLC layers, each reflecting opposite polarizations, in combination with a smart window. An additional embodiment consists of an infrared reflecting film comprising flakes embedded in a transparent medium used in combination with a smart window.

Figure 5A:
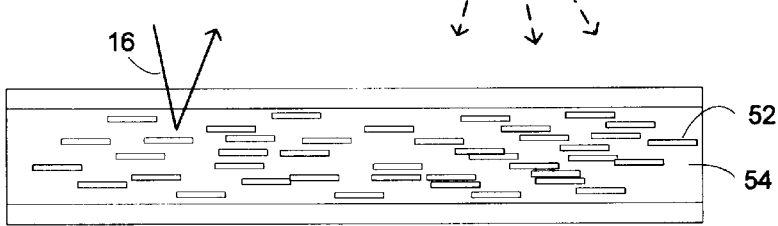
FIG. 5a–c shows an additional scattering panel of the invention for further controlling light transmitted through the "smart window".
Figure 5B:
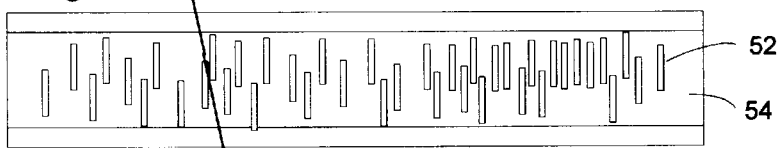
Figure 5C:
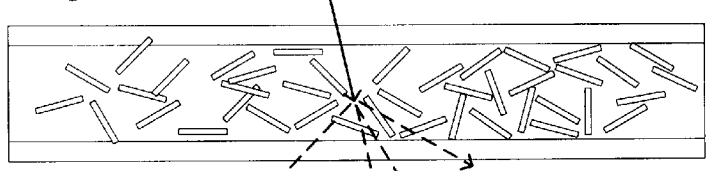

Controllable scattering structures are shown in detail in copending applications which are included by reference. FIG. 5a–c show a novel structure, whereby flakes 52 of reflective film are suspended in a fluid material 54. The orientation of the flakes may be controlled by an electric field. The light incident upon the scattering structure is shown to be reflected, transmitted, or scattered in FIGS. 5a, 5b, and 5c respectively, depending on the orientation of the flakes. The flakes are typically of dimensions of ten to fifty microns in diameter. Use of such light controlling flakes for CLC materials is shown in copending application Ser. No. 08/787,282 entitled "Cholesteric Liquid Crystal Inks" by Sadeg M. Faris. Flakes of the film of the invention may be used suspended in any transparent material as reflecting paint. The broad bandwidth of the film is useful in reflecting light which is incident at a large angle of incidence to the surface of the film. Flakes of multilayer transparent polymer material may be used in an additional embodiment.

FIG. 6a and 6b show an embodiment of a scattering layer, which shows light rays 60 incident on a layer 62 which contained a polymer material 63 contained between two transparent electrically conducting layers 42. Contained within the polymer are regions 66 of liquid crystal material formed into small spheres of micron or submicron dimension. Such a material is called a polymer dispersed liquid crystal (PDLC). The molecules of the liquid crystal material, sketched in FIG. 6a as short lines, are correlated by the internal forces in the liquid crystal to have internal order, which may random from droplet to droplet as shown in FIG. 6a. Light propagating through the polymer material 63 strikes the droplet of liquid crystal material 66, and will in general refract at the polymer liquid crystal interface because there will generally be a difference in the index of refraction of the (randomly direction) liquid crystal material and the polymer material. The layer 62 will then scatter light passing through.

The light rays traced in FIG. 6a are shown scattered and transmitted through the layer 62, which would be the case for very light loading of liquid crystal material in the polymer. In the more general case, light incident on the panel would be as likely scattered backward as forward, and would likely be scattered isotropically in all directions.

FIG. 6b shows the results of applying an electric field across the layer 62 by applying voltage across the conducting layers 42. The electric field forces the liquid crystal molecules in each sphere to line up parallel with the field. In this case, the index of refraction of the liquid crystal material matches the index of the polymer material, and the light rays pass through the layer 62 without deviation or scattering.

Figure 7A:
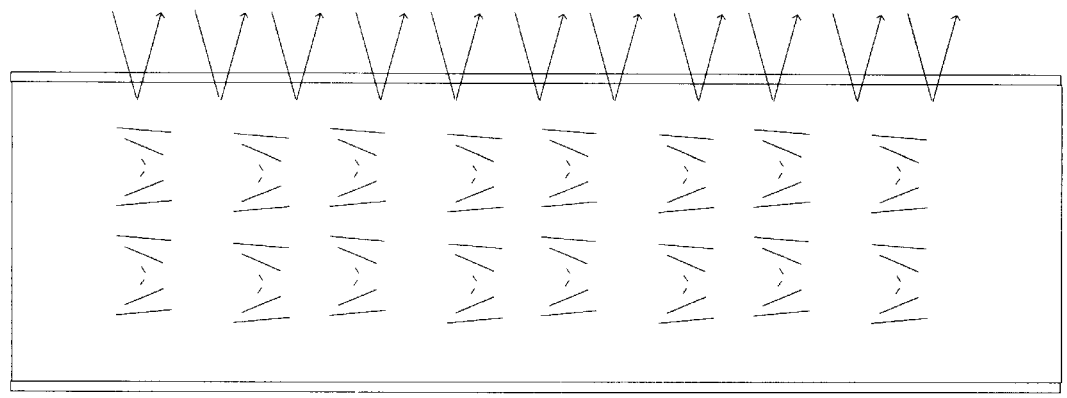
FIG. 7a–c shows an additional scattering panel of the invention for further controlling light transmitted through the "smart window".
Figure 7B:
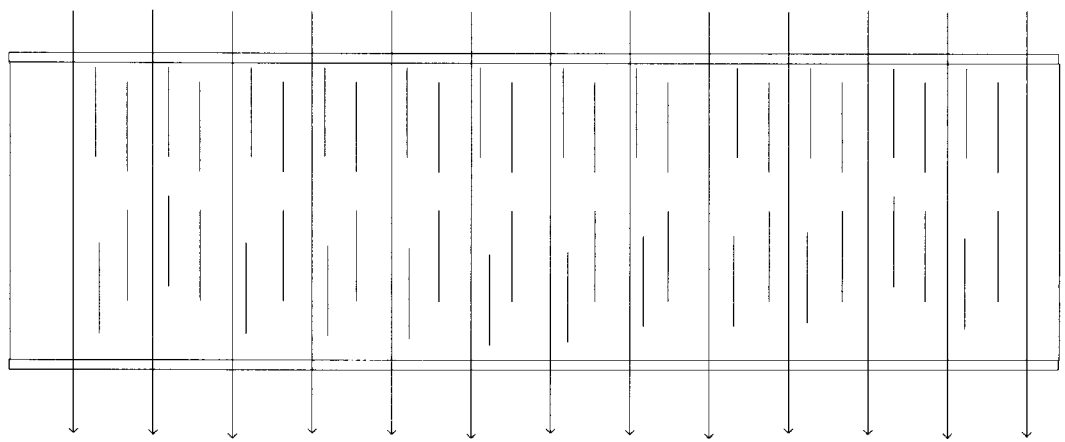
Figure 7C:
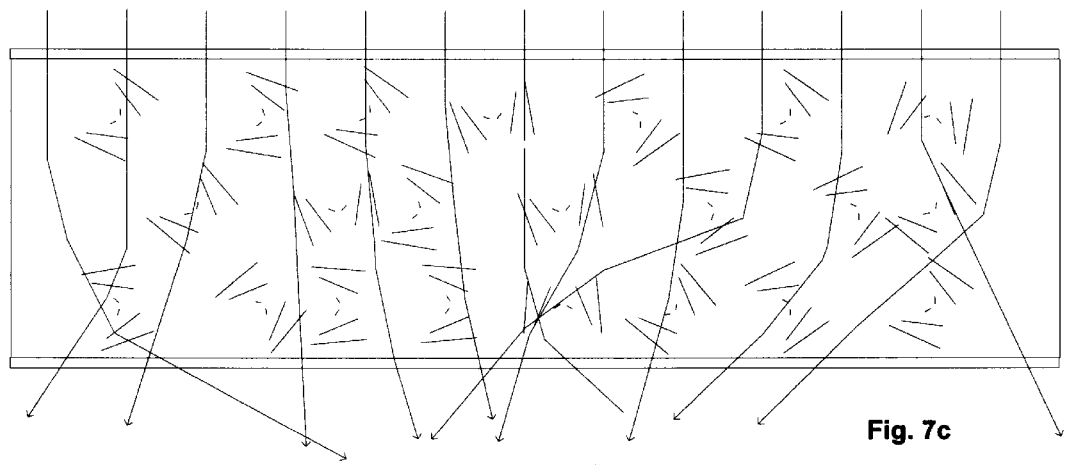

An alternative embodiment for a scattering layer is sketched in FIGS. 7a–c. The liquid crystal material is admixed with a polymer material, but unlike the case of FIG. 6a, the resultant material does not phase segregate. The material is considered to have polymer stabilized cholesteric texture (PSCT). The linear liquid crystal molecules remain entangled in the polymer material, which can be thought as a mass of wet, springy spaghetti. FIG. 7a shows the liquid crystal molecules as short lines. In the case of FIG. 7a, the molecules are lined up parallel with the conducting plates because, for example, the surfaces of the plates have a rubbed alignment layer and the liquid crystal molecules adjacent the surface layer line up parallel to the rubbing direction. In the example shown, the internal order of the molecules in the layer 73 also aligns them to reflect incident light of wavelength $\lambda_o$ within a bandwidth $\pm\Delta\lambda=(\Delta n/n)\lambda_o$, where $\Delta n$ is the change in index of refraction n of the liquid crystal material rotate and $\lambda_o = np$, where p is the pitch of rotation of the liquid crystal material. When an electric field is impressed across the layer as in FIG. 7b, the molecules rotate to line up parallel to the field, and light propagating parallel to the field passes through the 1a without scattering, reflection, or absorption. When the electric field is turned off, the polymer acts as a restoring force to rotate the molecules back to their starting position as shown in FIG. 7a.

FIG. 7c shows the mixture when no external order is imposed on the liquid crystal material by a rubbed alignment layer or by electric field. The liquid crystal material still wants to lower its internal energy by having near neighbor molecules align with one another, but there is no long range order. The regions of oriented material, which may have order over a distance comparable to the wavelength of light, now scatter light randomly and, with no field applied, the light incident on the layer 74 is scattered. When an electric field is impressed, the molecules swing around to line up with the field, and the light passes through without scattering as in FIG. 7b.

We claim:

1. An electro-optical glazing structure having reflection and transmission modes of operation for selectively reflecting and transmitting electromagnetic radiation, respectively, the electro-optical glazing structure comprising:

an electro-optical panel, having first and second optical states of operation;

optical state switching means for switching the electro-optical panel to the first optical state of operation in order to induce electro-optical glazing structure into the reflection mode of operation, and for switching the electro-optical panel to the second optical state of operation in order to induce the electro-optical glazing structure into the transmission mode of operation, and means for further controlling electromagnetic radiation incident on the electro-optical panel.

2. The electro-optical glazing structure of claim 1, wherein the means for further controlling the the electromagnetic radiation incident comprises a scattering layer for controllably scattering light.

3. The electro-optical glazing structure of claim 2, wherein the scattering layer comprises a fluid medium containing a large plurality of anisotropically shaped objects for controllably scattering light, the orientation of anisotropically shaped objects controllable by an electric field.

4. The electro-optical glazing structure of claim 3, wherein the anisotropically shaped objects are micron size sheets of reflecting material.

5. The electro-optical glazing structure of claim 4, wherein the micron size sheets of reflecting material are multilayer polymer reflectors.

6. The electro-optical glazing structure of claim 5, wherein the micron size sheets of reflecting material are multilayer polymer reflectors, wherein the multilayer polymer reflectors have a non-linear pitch distribution.

7. The electro-optical glazing structure of claim 4, wherein the micron size sheets of reflecting material are cholesteric liquid crystal (CLC) reflectors.

8. The electro-optical glazing structure of claim 7, wherein the micron size sheets of reflecting material are cholesteric liquid crystal (CLC) reflectors have a non linear pitch distribution.

9. The electro-optical glazing structure of claim 2, wherein the means for further controlling the the electromagnetic radiation incident comprises a polymer dispersed liquid crystal (PDLC) layer.

10. The electro-optical glazing structure of claim 2, wherein the means for further controlling the the electromagnetic radiation incident comprises a polymer stabilized cholesteric texture material layer.

11. The electro-optical glazing structure of claim 1, wherein the electro-optical panel further comprises a multilayer reflector.

12. The electro-optical glazing structure of claim 11, wherein the means for further controlling the the electromagnetic radiation incident comprises a scattering layer for controllably scattering light.

13. The electro-optical glazing structure of claim 12, wherein the scattering layer comprises a fluid medium containing a large plurality of anisotropically shaped objects for controllably scattering light, the orientation of anisotropically shaped objects controllable by an electric field.

14. The electro-optical glazing structure of claim 13, wherein the anisotropically shaped objects are micron size sheets of reflecting material.

15. The electro-optical glazing structure of claim 14, wherein the micron size sheets of reflecting material are multilayer polymer reflectors.

16. The electro-optical glazing structure of claim 15, wherein the micron size sheets of reflecting material are multilayer polymer reflectors, wherein the multilayer polymer reflectors have a non-linear pitch distribution.

17. The electro-optical glazing structure of claim 14, wherein the micron size sheets of reflecting material are cholesteric liquid crystal (CLC) reflectors.

18. The electro-optical glazing structure of claim 17, wherein the micron size sheets of reflecting material are cholesteric liquid crystal (CLC) reflectors have a non linear pitch distribution.

19. The electro-optical glazing structure of claim 12, wherein the means for further controlling the the electromagnetic radiation incident comprises a polymer dispersed liquid crystal (PDLC) layer.

20. The electro-optical glazing structure of claim 12, wherein the means for further controlling the the electromagnetic radiation incident comprises a polymer stabilized cholesteric tecture material layer.

21. The electro-optical glazing structure of claim 11, wherein multilayer reflector has a large plurality of layers having a non linear pitch distribution.

22. The electro-optical glazing structure of claim 1, wherein the electro-optical panel further comprises a CLC layer.

23. The electro-optical glazing structure of claim 22, wherein the CLC layer has a non linear pitch distribution.

24. The electro-optical glazing structure of claim 23, wherein the means for further controlling the the electromagnetic radiation incident comprises a scattering layer for controllably scattering light.

25. The electro-optical glazing structure of claim 24, wherein the scattering layer comprises a fluid medium containing a large plurality of anisotropically shaped objects for controllably scattering light, the orientation of anisotropically shaped objects controllable by an electric field.

26. The electro-optical glazing structure of claim 25, wherein the anisotropically shaped objects are micron size sheets of reflecting material.

27. The electro-optical glazing structure of claim 26, wherein the micron size sheets of reflecting material are multilayer polymer reflectors.

28. The electro-optical glazing structure of claim 27, wherein the micron size sheets of reflecting material are multilayer polymer reflectors, wherein the multilayer polymer reflectors have a non-linear pitch distribution.

29. The electro-optical glazing structure of claim 26, wherein the micron size sheets of reflecting material are cholesteric liquid crystal (CLC) reflectors.

30. The electro-optical glazing structure of claim 29, wherein the micron size sheets of reflecting material are cholesteric liquid crystal (CLC) reflectors have a non linear pitch distribution.

31. The electro-optical glazing structure of claim 24, wherein the means for further controlling the the electromagnetic radiation incident comprises a polymer dispersed liquid crystal (PDLC) layer.

32. The electro-optical glazing structure of claim 24, wherein the means for further controlling the the electromagnetic radiation incident comprises a polymer stabilized Cholesteric texture material layer.

33. The electro-optical glazing structure of claim 1, wherein the means for further controlling the the electromagnetic radiation incident comprises a means for controllably reflecting circularly polarized light.

34. The electro-optical glazing structure of claim 33, wherein the means for reflecting circularly polarized light comprise a cholesteric liquid crystal (CLC) reflector.

35. The electro-optical glazing structure of claim 1, wherein the means for further controlling the the electromagnetic radiation incident comprises an absorbing layer for controllably absorbing light.

36. The electro-optical glazing structure of claim 1, wherein absorbing layer is an electrochromic absorbing layer.

* * * * *